United States Patent [19]

Nakamura et al.

[11] Patent Number: 5,062,744
[45] Date of Patent: Nov. 5, 1991

[54] APPARATUS FOR CONFIRMING MOVEMENT OF TAP WHEN RIGID TAPPING

[75] Inventors: Kosei Nakamura, Hino; Kazuhisa Numai, Yamanashi, both of Japan

[73] Assignee: Fanuc Ltd., Yamanashi, Japan

[21] Appl. No.: 474,758

[22] PCT Filed: Jul. 27, 1989

[86] PCT No.: PCT/JP89/00747
§ 371 Date: Mar. 26, 1990
§ 102(e) Date: Mar. 26, 1990

[87] PCT Pub. No.: WO90/01388
PCT Pub. Date: Feb. 22, 1990

[30] Foreign Application Priority Data

Aug. 3, 1988 [JP] Japan .................... 63-192824

[51] Int. Cl.⁵ .............................................. B23G 1/44
[52] U.S. Cl. .................................. 408/8; 10/139 R; 364/474.02
[58] Field of Search ............. 408/5, 6, 8, 9, 10, 408/11; 10/129 R, 139 R; 364/474.02, 474.12, 474.16

[56] References Cited

U.S. PATENT DOCUMENTS 4,692,071 9/1987 Hirota ............................ 408/10
4,813,821 3/1989 Hirota ............................ 408/10
4,879,660 11/1989 Asakura et al. ............... 408/9

FOREIGN PATENT DOCUMENTS 54-13080 1/1979 Japan .
62-188623 8/1987 Japan .
63-185519 8/1988 Japan .

Primary Examiner—Daniel W. Howell
Attorney, Agent, or Firm—Armstrong, Nikaido, Marmelstein, Kubovcik, & Murray

[57] ABSTRACT

When tapping is effected by a tap driven by a built-in spindle motor (12) and another motor (22), which built-in spindle motor directly drives the tap (14) to rotate without a transmission mechanism, and which other motor drives the tap (14) with the built-in spindle motor (12) to proceed along a longitudinal direction (Z), the two motors (12, 22) are synchronously controlled, and the difference between a commanded rotational speed output to the built-in spindle motor (12) from a synchronous control unit (36) and an actual rotational speed of the built-in spindle motor detected by a detector (16) is calculated by a difference calculator (32), and an alarm is output, for example, by a light-emitting diode (40), when the difference is higher than a prescribed value. Thereby, a high-speed tapping can be effected, the number of defective products can be reduced, and the threads accurately tapped.

1 Claim, 2 Drawing Sheets

APPARATUS FOR CONFIRMING MOVEMENT OF TAP WHEN RIGID TAPPING

TECHNICAL FIELD

The present invention relates to an apparatus for confirming the movement of a tap when tapping a thread by employing a spindle directly rotated by a built-in spindle motor in synchronization with a Z-axis motor driving the spindle in the forward and rearward directions along a central axis thereof, in a machine tool, namely, when rigid tapping, more particularly to an apparatus by which a rapid and precise tapping is effected.

BACKGROUND ART

Conventionally a tap is rotated and moved linearly by a spindle motor for rotating the spindle and a Z-axis motor for moving the spindle linearly along an axis thereof, i.e., a direction Z. The spindle is rotated at a set speed corresponding to the pitch of a thread to be cut when a workpiece is tapped by a tap attached to the spindle of a machine tool. In this operation, the motors are affected by load fluctuations during the tapping process, depending on the output of each motor, and thus a thread having a constant pitch is not always formed. Therefore, an error of the pitch of the thread to be tapped is absorbed by a floating tapper tap system, i.e., a system wherein a spring is incorporated to force the tap along the axis of the spindle.

The above-mentioned floating tapper tap system, however, is not always suitable for high speed tapping with a high accuracy, and the products must be inspected for defects, and thus the production efficiency is lowered.

DISCLOSURE OF THE INVENTION

Accordingly, an object of the present invention is to determine whether or not a tapping is too fast for a motor to follow up, and to reduce the number of defective products to thereby achieve a highly effective tapping while both motors are synchronously controlled.

In accordance with the present invention, there is provided an apparatus for confirming the movement of a tap when rigid tapping with a machine tool having a built-in spindle motor for directly driving a spindle to rotate and a Z-axis motor for driving the spindle to move linearly along an axis of the spindle, comprising a detecting means for detecting a rotation of the spindle, a spindle control means for outputting a signal for controlling a rotation of the spindle motor according to a signal output from the detecting means, a Z-axis control means for outputting a signal for controlling a rotation of the Z-axis motor, a synchronous control means for outputting a synchronous signal to the spindle control means and the Z-axis control means, respectively, and a judgement means for judging an ability of the spindle motor to follow up, by comparing a prescribed reference signal with a signal of a rotational error of the spindle calculated by the spindle control means, using the synchronous signal from the synchronous control means and the signal from the detecting means.

A power limit against a load is lower in a built-in spindle motor for directly driving the spindle than in a Z-axis motor for driving the spindle by way of a ball screw shaft, etc., to move linearly along a direction Z. Accordingly, a rigid tapping cannot be effected at an acceleration or deceleration greater than the power limit of the spindle motor, even though both motors are synchronously controlled by the synchronous control means to maintain the pitch of a thread tapped in a workpiece at a constant value. The follow-up ability of the built-in spindle motor is judged by the judgement means by comparing the reference value with a difference between a rotational speed of the spindle motor required for the synchronous control and an actual rotational speed of the spindle driven by the spindle motor and detected by the detecting means.

BEST MODE OF CARRYING OUT THE INVENTION

Figure 1:
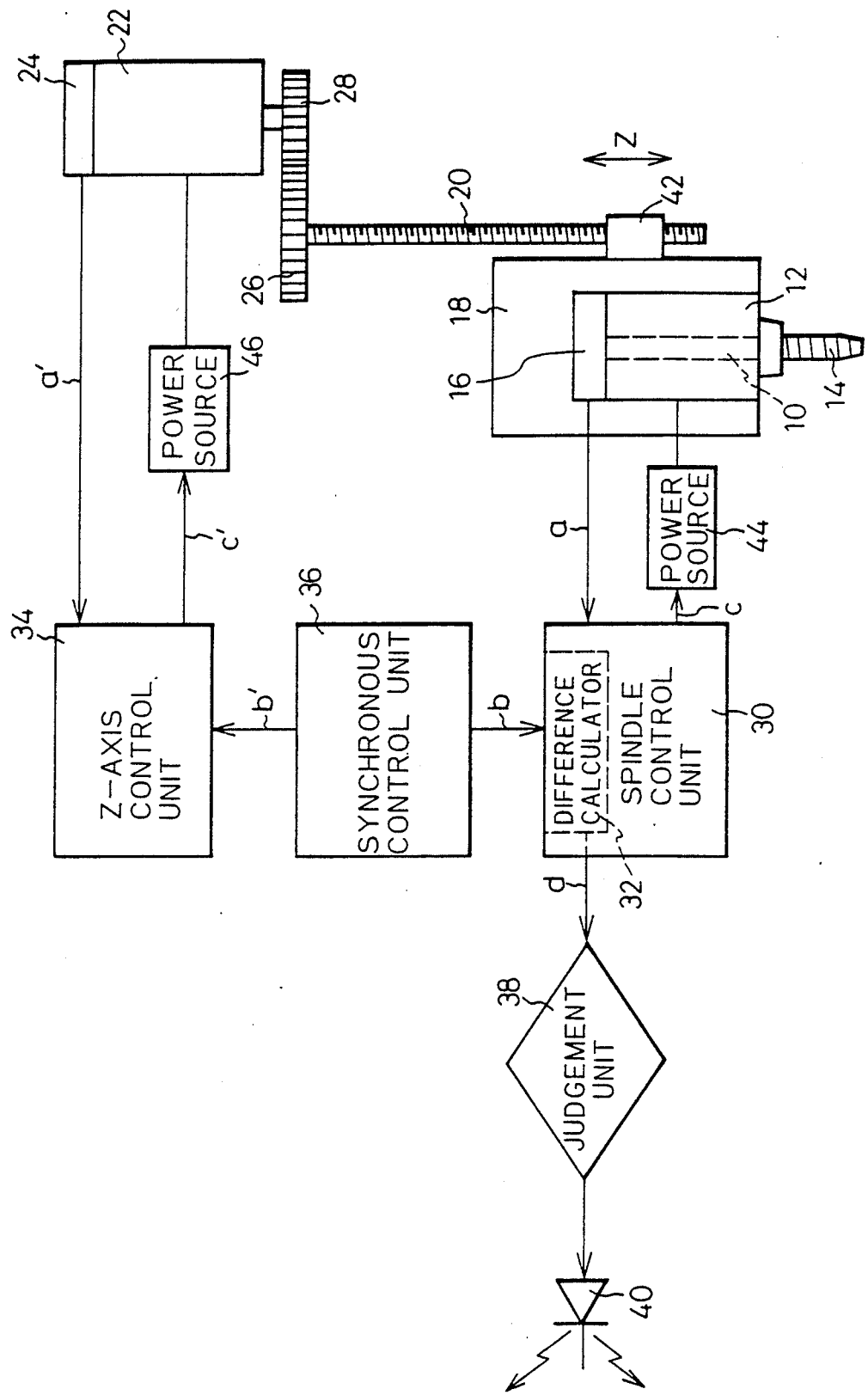
FIG. 1 is a structural view of an apparatus for confirming a movement of a tap when rigid tapping according to the present invention.

The present invention is described in more detail in the following and in accordance with the embodiments shown in the attached drawings. Currently, a spindle motor directly built onto the spindle in a machine tool is used for driving the spindle, to provide a compact apparatus. Referring to FIG. 1, a built-in spindle motor 12 is housed in a spindle head 18, a tap 14 is attached coaxially to the spindle 10, and the tap 14 is directly driven to rotate by the spindle motor 12. Further, the spindle 10 is driven to move linearly along a central axis of the spindle 10, i.e., a direction Z, with the spindle head 18 by a Z-axis motor 22. The spindle head 18 can be moved linearly and smoothly along a ball screw shaft 20 in the direction Z by a ball nut 42 engaged with the ball screw shaft 20. A gear 26 is attached to one end of the ball screw shaft 20, and engaged with another gear 28 attached to an output shaft of the Z-axis motor 22, and thus the spindle 10 can be moved with the spindle head 18 linearly along the direction Z by the Z-axis motor 22 through a transmission mechanism such as gears 28, 26 and the ball screw shaft 20.

A detector 16 or 24, such as a tachogenerator or a pulse-encoder, is attached to each motor 12, 22 for detecting a rotational speed thereof. A rotational speed A of the spindle 10 detected by the detector 16 is input to a spindle control unit 30 as a signal a, and the spindle control unit 30 further receives a signal b, designating a rotational speed B at which the spindle 10 must rotate, from a synchronous control unit 36 mentioned later, whereby a rotational difference between the commanded rotational speed B and the actual rotational speed A is calculated by a differential calculator 32 incorporated as a part of the spindle control unit 30 for calculating a difference between two speeds A and B designated by the two signals. The spindle control unit 30 sends a signal c to a power source 44 to supply a necessary current to the spindle motor 12, taking into account the commanded rotational speed B designated by the signal b from the synchronous control unit 36 and the above-mentioned rotational difference. Namely, a servo-loop control for the spindle motor 12 is effected by the detector 16 and the spindle control unit 30.

A servo-loop control for the Z-axis motor 22 is similarly effected by the detector 24 and a Z-axis control unit 34, so that the motor 22 is driven to rotate at a required rotational speed. The tap 14 having a prescribed pitch must be driven to rotate and to move along an axis thereof, i.e., the direction Z, at a linear speed corresponding to the rotational speed when tapping. Therefore, the spindle motor 12 and the Z-axis motor 22 must be controlled synchronously. The unit for effecting this synchronous control is designated by the reference numeral 36 as mentioned above. The above-mentioned Z-axis control unit 34 receives a signal b' designating a commanded rotational speed, from the synchronous control unit 36, and sends a signal c' to a power source 46 to supply a necessary current to the Z-axis motor 22, taking into account a signal a' designating a detected rotational speed of the Z-axis motor 22 from the detector 24.

As mentioned above, the tap 14 is rotated directly by the spindle motor 12 and is moved in a direction Z with the spindle head 18 by the Z-axis motor 22 through elements 20, 26, and 28 of the transmission mechanism. When tapping is effected in such a manner, a linear moving speed of the tap 14 can be properly selected by selecting an appropriate transmission mechanism as a mechanism for driving the tap 14 in the direction Z. Nevertheless, a transmission mechanism cannot be used for the rotation of the tap 14, and thus the limitation of the tapping work is defined only by the power output of the spindle motor 12. Especially during tapping involving a large acceleration or deceleration of the tap 14, the efficiency of the tapping work is restricted by an ability the power output of the spindle motor 12.

Figure 2:
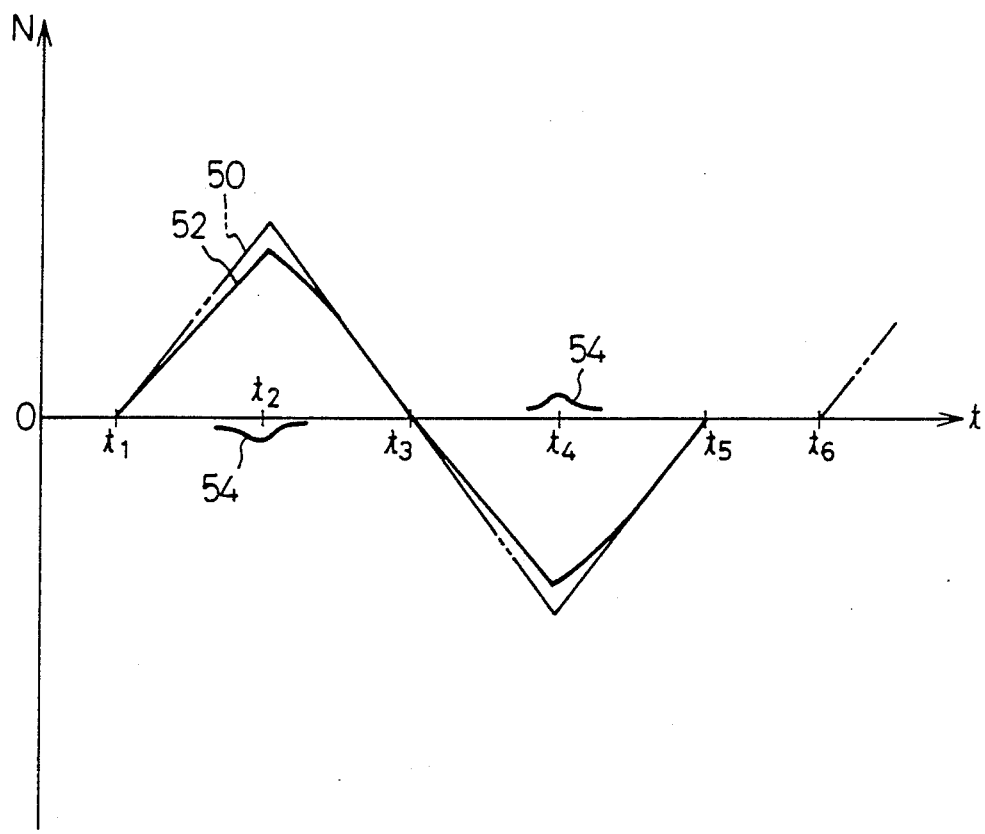
FIG. 2 is a diagram for explaining the process of a tapping operation.

FIG. 2 is a diagram for explaining the movement of the tap having a linearly increasing or decreasing speed. As mentioned above, the efficiency of the tapping work and the accuracy of the thread to be tapped are restricted by the follow up ability of the spindle motor 12 when the tapping work is efficiently effected, i.e., when the tap is driven with a large acceleration or deceleration. Accordingly, only the following judgement may be made for the spindle motor 12.

The synchronous control unit 36 sends a signal to the spindle control unit 30, whereby the spindle motor 12 is rotated in accordance with a linearly changed curve 50 of a rotational speed N designated by two dotted line, when tapping at a prescribed pitch. Upon receiving the signal, the spindle control unit 30 controls the drive of the spindle motor 12 in accordance with a signal indicating the curve 50 through the servo-loop control. The process indicated by the curve 50 is as follows. Tapping starts at time t1, and the rotational speed N increases at a constant acceleration until a time t2, and then decreases at a constant deceleration to reach zero at a time t3. The tapping work is then completed by the above operations, and thereafter, a reverse rotational speed is increases until a time t4, and then decreased to reach zero at a time t5. The next tapping operation is started at a time t6. Usually, a delay in the movement of the rotor of the motor occurs after receiving a command, due to the rotational inertia there of, but this delay is compensated by the above servo-loop control. Nevertheless, since each motor 12 or 22 has a power limitation, the rotation of the spindle motor 12 is delayed in accordance with the level of acceleration or deceleration on the curve 50, and thus in practice, a delay occurs as shown by a solid line 52, compared with the curve 50 indicating a commanded rotational speed in FIG. 2. The difference derived by subtracting the commanded rotational speed 50 from the actual rotational speed 52, i.e., the rotational error, is designated by reference numeral 54. Usually, a long delay occurs at a changeover from an acceleration to deceleration, and vice versa, as shown in FIG. 2.

If the tapping work is continued without detecting the above-mentioned delay of the spindle motor 12, the products are defective and the work efficiency is lowered because they must be inspected. Therefore, a difference calculator 32 calculates the rotational error, i.e., the difference between the commanded rotational speed indicated by the signal b and the detected rotational speed indicated by the signal a from the detector 16, and outputs a signal d indicating the rotational error to a judgement unit 38, which compares the rotational error with a prescribed allowable value. This judgement shows the limitation of the follow-up 20 ability of the spindle motor 12, for example, by a light from the light-emitting diode 40. The working speed can be adjusted by observing the light and thus defective products are not manufactured, and a fast and highly effective tapping operation is achieved.

As apparent from the foregoing description, the present invention prevents the appearance of defective products during the manufacture, and a highly effective tapping is effected.

We claim:

1. An apparatus for confirming movement of a tap when rigid tapping with a machine tool having a built-in spindle motor for directly driving a spindle to rotate and a Z-axis motor for driving the spindle to move linearly along an axis of the spindle, comprising:
   a detecting means for detecting a rotation of said spindle;
   a spindle control means for outputting a signal to control a rotation of said spindle motor according to a signal output from said detecting means;
   a Z-axis control means for outputting a signal to control a rotation of said Z-axis motor;
   a synchronous control means for outputting each synchronous signal to said spindle control means and said Z-axis control means, respectively; and
   a judgement means for judging a follow-up ability of said spindle motor, by comparing a prescribed reference signal with a signal of a rotational error of said spindle calculated by said spindle control means, using the synchronous signal from said synchronous control means and the signal from said detecting means.

* * * * *